US012767246B2

(12) United States Patent
Herrmann et al.

(10) Patent No.: US 12,767,246 B2
(45) Date of Patent: Oct. 20, 2026

(54) LATERAL REAR REGION OF A MOTOR VEHICLE COMPRISING AN AIR DIRECTING DEVICE, AND MOTOR VEHICLE

(71) Applicant: Dr. Ing. h.c. F. Porsche Aktiengesellschaft, Stuttgart (DE)

(72) Inventors: Bernd Herrmann, Ehningen (DE); Joachim Paul, Benningen a.N. (DE); Okan Gönüldinc, Ostfildern (DE); Moritz Zeh, Stuttgart (DE); Dominik Beierl, Korntal-Münchingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 301 days.

(21) Appl. No.: 18/617,686

(22) Filed: Mar. 27, 2024

(65) Prior Publication Data

US 2024/0343318 A1 Oct. 17, 2024

(30) Foreign Application Priority Data

Apr. 12, 2023 (DE) ........................ 102023109191.3

(51) Int. Cl.

| | |
|---|---|
| ***B62D 35/00*** | (2006.01) |
| ***B62D 37/02*** | (2006.01) |
| ***F16H 21/18*** | (2006.01) |

(52) U.S. Cl.

CPC ......... *B62D 35/007* (2013.01); *B62D 35/008* (2013.01); *B62D 37/02* (2013.01); *F16H 21/18* (2013.01)

(58) Field of Classification Search

CPC ..... B62D 35/007; B62D 35/008; B62D 37/02

See application file for complete search history.

(56) References Cited

U.S. PATENT DOCUMENTS 6,029,873 A * 2/2000 Won .......................... B60R 9/04 224/326
9,868,478 B2 * 1/2018 Kishima .............. B60Q 1/0017
(Continued)

FOREIGN PATENT DOCUMENTS

DE 102007003601 A1 7/2007
DE 202011005504 U1 10/2011
(Continued)

OTHER PUBLICATIONS

Search Report dated Jan. 13, 2024, by the German Patent Office for Application No. 10 2023 109 191.3 and a Machine translation of the Search Report. (16 pages).

*Primary Examiner* — Tara Schimpf
*Assistant Examiner* — Daniel T Craig
(74) *Attorney, Agent, or Firm* — Buchanan Ingersoll & Rooney PC

(57) ABSTRACT

A lateral rear region of a motor vehicle includes a rear vehicle body member extending at least behind a rear wheel housing of the motor vehicle. The lateral rear region includes an air directing device, wherein an air guidance element of the air directing device is displaceable relative to the rear vehicle body member between a rest position retracted in the lateral rear region and an operational position extended out of the lateral rear portion. In the retracted rest position, a flow guide surface of the air guidance element is covered by the rear vehicle body member. In the extended operational position, the flow guide surface of the air guidance element is, at least in the longitudinal direction of the motor vehicle, displaced rearward relative to the rear vehicle body member.

11 Claims, 12 Drawing Sheets

(56) References Cited

U.S. PATENT DOCUMENTS

| | | | | |
|---|---|---|---|---|
| 11,338,867 | B2 * | 5/2022 | Ferri ...................... | B62D 37/02 |
| 11,827,284 | B2 * | 11/2023 | Beierl .................... | B62D 37/02 |
| 2016/0318560 | A1 | 11/2016 | Kishima | |
| 2020/0094888 | A1 | 3/2020 | Grebel | |

FOREIGN PATENT DOCUMENTS

| | | | |
|---|---|---|---|
| DE | 102016206531 | A1 | 11/2016 |
| DE | 102017208885 | A1 | 11/2018 |
| DE | 102018123487 | A1 | 3/2020 |
| DE | 102019114113 | A1 | 12/2020 |
| DE | 102019207906 | A1 | 12/2020 |
| DE | 102021118408 | B3 | 8/2022 |
| FR | 3001192 | A1 | 7/2014 |

* cited by examiner

LATERAL REAR REGION OF A MOTOR VEHICLE COMPRISING AN AIR DIRECTING DEVICE, AND MOTOR VEHICLE

CROSS-REFERENCE TO RELATED APPLICATION

This application claims priority to German Patent Application No. 10 2023 109 191.3, filed Apr. 12, 2023, the content of such application being incorporated by reference herein in its entirety.

FIELD OF THE INVENTION

The invention relates to a lateral rear region of a motor vehicle comprising an air directing device. The invention further relates to a motor vehicle.

BACKGROUND OF THE INVENTION

A wide variety of motor vehicle air directing devices are known in practice. Air directing devices that are associated with a lateral region of a motor vehicle and used to guide flow in that location are also referred to as sideblades.

DE 10 2019 207 906 A1, which is incorporated by reference herein, discloses a motor vehicle comprising a sideblade, which is arranged above a rear wheel behind a window of a rear vehicle door.

DE 20 2011 005 504 U1, which is incorporated by reference herein, discloses a motor vehicle comprising an air directing element that extends between a front wheel and a rear wheel and is used to guide flow in that location.

DE 10 2018 123 487 A1, which is incorporated by reference herein, discloses a motor vehicle comprising an air directing device designed as a wheel spoiler.

DE 10 2019 114 113 A1, DE 10 2007 003 601 A1, and FR 3 001 192 A1, which are each incorporated by reference herein, disclose further art.

SUMMARY OF THE INVENTION

The invention relates to a lateral rear region of a motor vehicle comprising an air directing device used to guide flow in the lateral rear region behind a rear wheel housing of the motor vehicle. Described herein is a lateral rear region comprising an air directing device that is compact in construction, whose air guidance element can be reliably displaced relative to a rear vehicle body member of the rear region, and that allows for optimum flow guidance in the lateral rear region.

The lateral rear region of the motor vehicle according to aspects of the invention comprises a rear vehicle body member which extends at least behind a rear wheel housing of the motor vehicle. The lateral rear region according to aspects of the invention further comprises an air directing device accommodated by the rear vehicle body member. The air directing device comprises an air guidance element, which is displaceable relative to the rear vehicle body member between a retracted rest position and an extended operational position such that, in the retracted rest position, a flow guide surface of the air guidance element is covered by the rear vehicle body member and that, in the extended operational position, the flow guide surface of the air guidance element is, at least in the longitudinal direction of the motor vehicle, displaced rearward relative to the rear vehicle body member. The air directing device further comprises a guide and drive unit, which guides and drives the air guidance element relative to the rear vehicle body member when displaced, whereby a drive of the guide and drive unit in the form of a crank drive comprising a crank, a crank arm, and a coupling arm, whereby the crank arm and the coupling arm implement a rotational movement of the crank during the displacement of the air guidance element of the air directing device relative to the rear vehicle body member. The invention enables optimal flow guidance in the lateral rear region of the motor vehicle, behind the rear wheel housing thereof. For this purpose, the lateral rear region according to aspects of the invention comprises the air directing device. The air directing device comprises the air guidance element and the guide and drive unit. The air guidance element is displaceable between the retracted rest position and the extended operational position by means of the guide and drive unit. A crank drive is used to drive the guide and drive unit. Such a guide and drive unit comprising a crank drive has a compact design, is robust, and thus enables a reliable displacement of the air guidance element of the air directing device.

The guide and drive unit preferably comprises at least one fixed guide rail and at least one sliding block that can be displaced relative to the fixed guide rail, whereby the crank drive displaces the respective sliding block relative to the respective guide rail, and displaces the air guidance element relative to the rear vehicle body member via the respective sliding block. As a result, given a compact design of the air directing device, the air guidance element, and thus the rear region, the air directing device can be reliably transitioned between the rest position and the operational position.

Preferably, one first end of the crank arm of the crank drive engages with the crank of the crank drive in a rotatably fixed manner, and a second end pivotably engages with the coupling arm of the crank drive, whereby a second end of the coupling arm pivotably engages with a guide carriage of the guide and drive unit, which is operatively connected to the air guidance element of the air directing device, and whereby the guide carriage engages with the respective sliding block and displaces the respective sliding block relative to the respective guide rail. The air guidance element can, given a compact design of the air directing device, and thus the rear region, be reliably transitioned between the rest position and the operational position.

The flow guide surface of the air guidance element is, on the one hand, preferably displaced rearward in the operational position relative to the rest position when viewed in the longitudinal direction of the motor vehicle and, on the other hand, outward when viewed in the transverse direction of the motor vehicle, preferably such that, in the operational position, the flow guide surface of the air guidance element extends flush with the front of outer surface of the rear vehicle body member that is immediately connected to the flow guide surface. A particularly advantageous flow guidance via the air directing device of the lateral rear region behind the rear wheel housing of the motor vehicle is thus possible in the lateral rear region.

BRIEF DESCRIPTION OF THE DRAWINGS

Preferred embodiments of the invention follow from the dependent claims and the subsequent description. Without being restricted thereto, example embodiments of the invention are explained in greater detail with reference to the drawings. Shown are:

DETAILED DESCRIPTION OF THE INVENTION

FIGS. 1*a* to 3*b* show a section of a lateral rear region 10 of a motor vehicle according to aspects of the invention. From the lateral rear region 10, a rear vehicle body member 11 is shown that, in the lateral rear region 10 of the motor vehicle, extends at least behind a rear wheel housing 12 of the motor vehicle.

Such a lateral rear region 10 is formed on both sides of the motor vehicle.

Figure 1A:
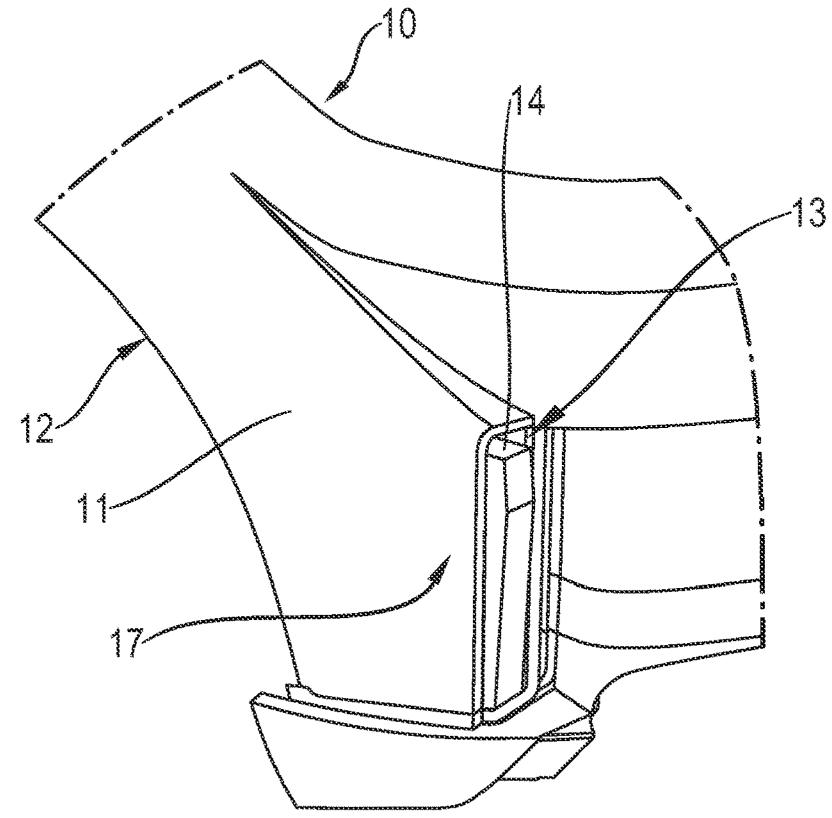
FIGS. 1*a*, 1*b* show two views of a lateral rear region of a motor vehicle according to the present invention in a first state with an air directing device in a retracted rest position.
Figure 1B:
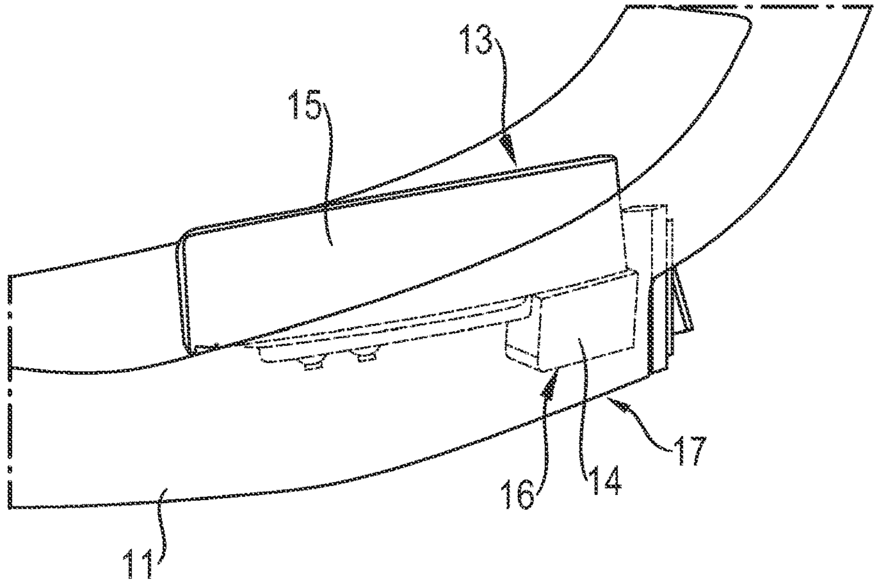
Figure 2A:
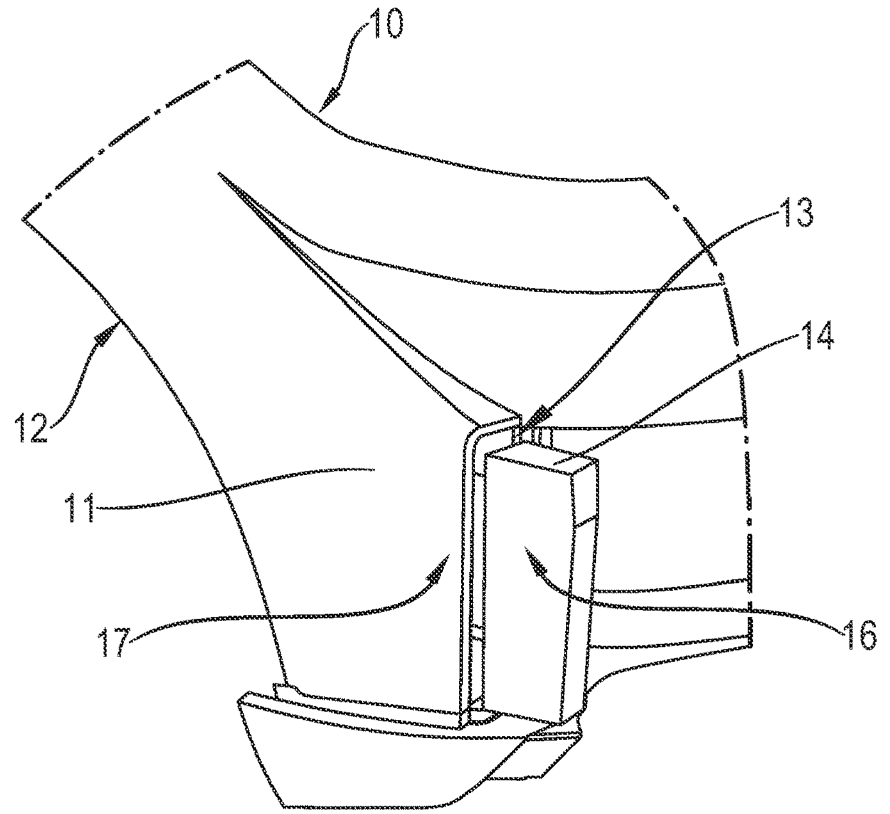
FIGS. 2*a*, 2*b* show two views of the lateral rear region of the motor vehicle according to aspects of the invention in a second state with an air directing device in an intermediate position between the retracted rest position and an extended operational position.
Figure 2B:
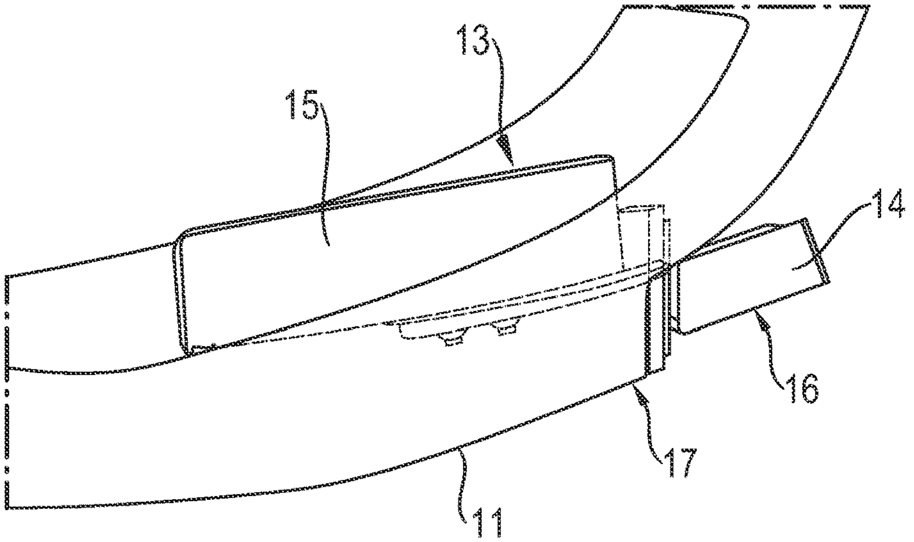
Figure 3A:
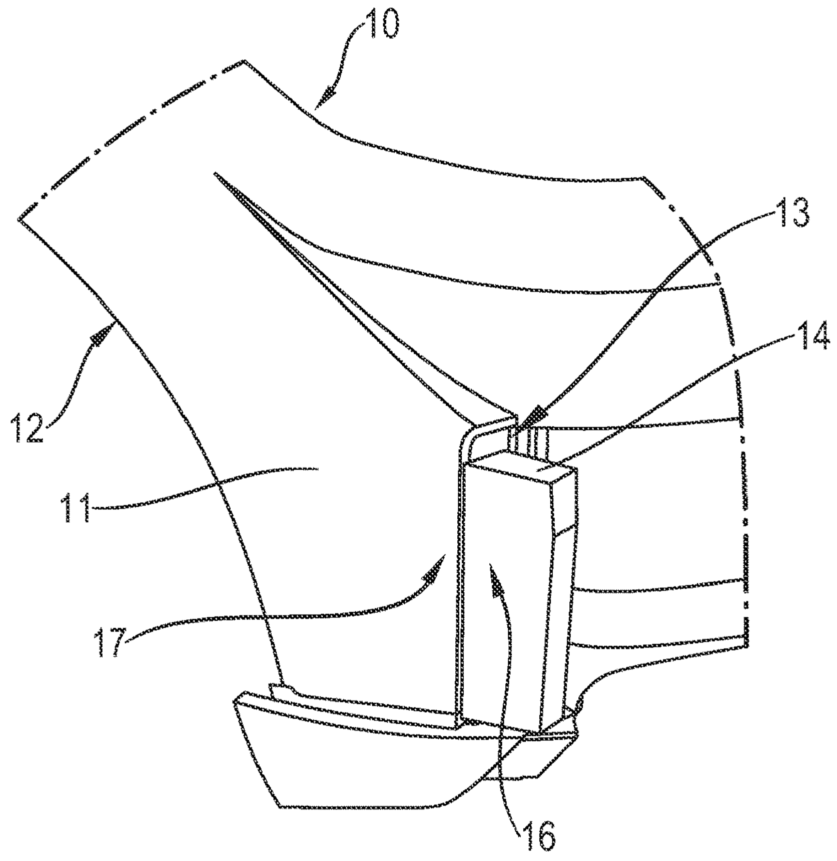
FIGS. 3*a*, 3*b* show two views of the lateral rear region of the motor vehicle according to aspects of the invention in a third state with an air directing device in the extended operational position.
Figure 3B:
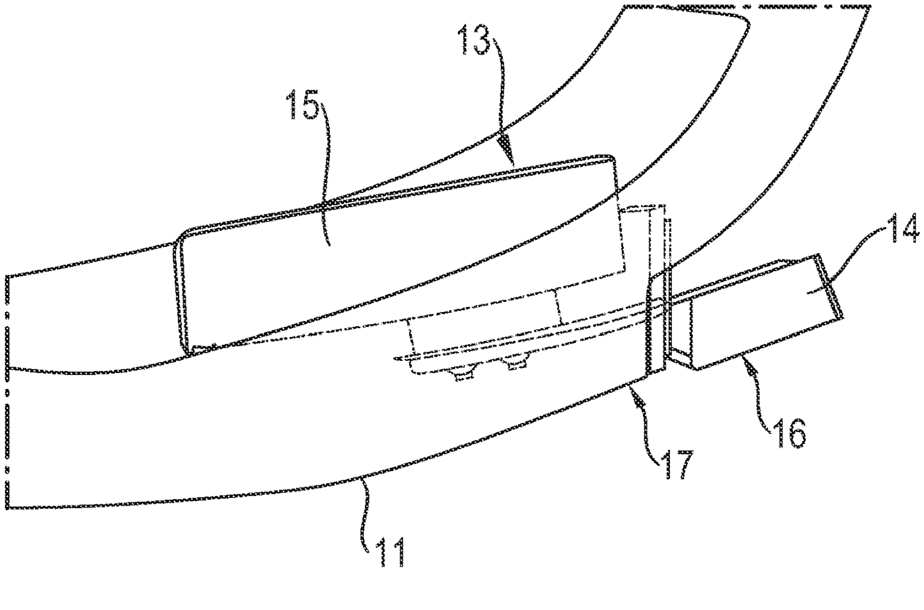

The lateral rear region 10 comprises an air directing device 13. The air directing device 13 comprises an air guidance element 14 as well as a guide and drive unit 15. By means of the guide and drive unit 15, the air guidance element 14 can be displaced relative to the rear vehicle body member 11 between a rest position retracted in the lateral rear region 10 (see FIGS. 1*a*, 1*b*) and an operational position extended out of the same (see FIGS. 3*a*, 3*b*), whereby FIG. 2*a*, 2*b* shows an intermediate position of the air guidance element 14 between the retracted rest position of FIGS. 1*a* and 1*b* and the extended operational position of FIGS. 3*a* and 3*b*.

The guide and drive unit 15 is completely covered by the rear vehicle body member 11 and is thus mounted in or on the lateral rear region 10 such that the guide and drive unit 15 is fixed relative to the rear vehicle body member 11. The air guidance element 14 is displaceable relative to the guide and drive unit 15, as well as relative to the rear vehicle body member 11.

The air guidance element 14 comprises a flow guide surface 16. In the retracted rest position (FIGS. 1*a*, 1*b*) of the air guidance element 14, the flow guide surface 16 thereof is retracted into the lateral rear region 10 and is covered by the rear vehicle body member 11.

In the extended operational position (FIGS. 3*a*, 3*b*) of the air guidance element 14, the flow guide surface 16 thereof is extended out of the lateral rear region 10 and is not covered by the rear vehicle body member 11, whereby, in the example embodiment shown, the flow guide surface 16 of the air guidance element 14 in the extended operational position is displaced relative to the retracted resting position, as viewed on the one hand in the longitudinal direction of the motor vehicle and, on the other hand, outward when viewed in the transverse direction of the motor vehicle.

In the intermediate position shown in FIGS. 2*a*, 2*b*, the flow guide surface 16 is only displaced rearward when viewed in the longitudinal direction of the motor vehicle. In the extended operational position (FIGS. 3*a*, 3*b*), the flow guide surface is also displaced outward when viewed in the transverse direction of the motor vehicle.

In the extended operational position of the air guidance element 14 (FIGS. 3*a*, 3*b*), the flow guide surface 16 of the air guidance element 14 is in particular moved outward when viewed in the transverse direction of the motor vehicle such that it extends flush to the front of an outer surface 17 of the rear vehicle body member 11 immediately connected to the flow guide surface 16.

Figure 10A:
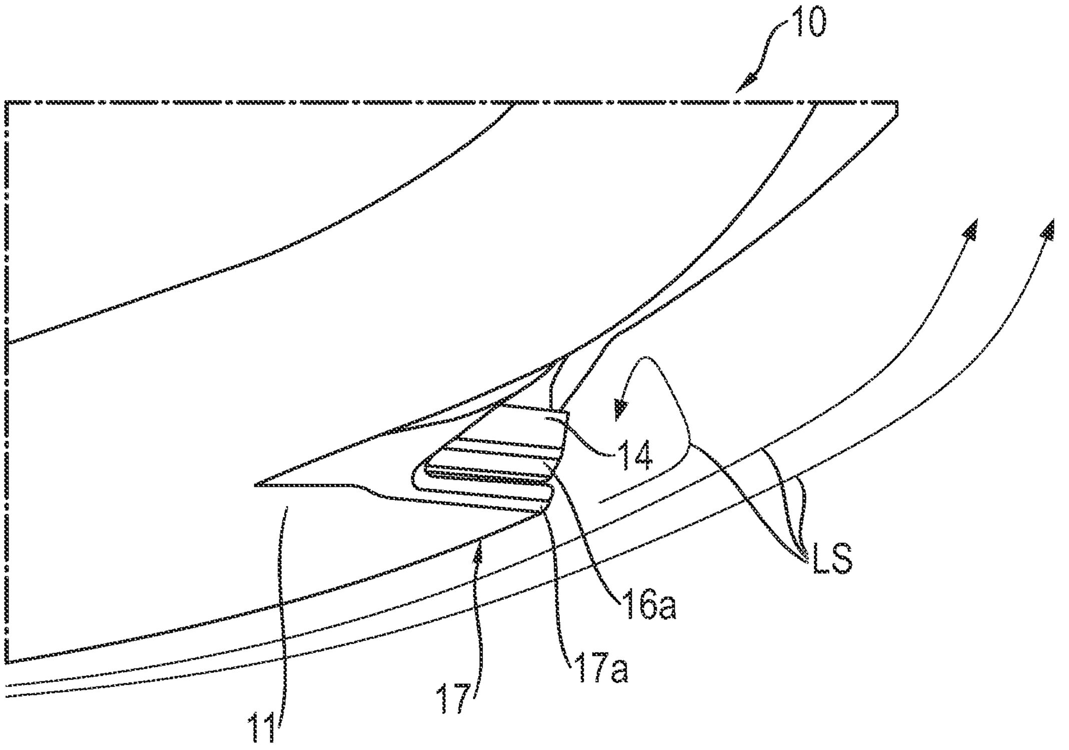
FIGS. 10*a*, 10*b* show two further views of the lateral rear region of the motor vehicle according to aspects of the invention in the retracted rest position and in the extended operational position (for clarification of the flow guidance)
Figure 10B:
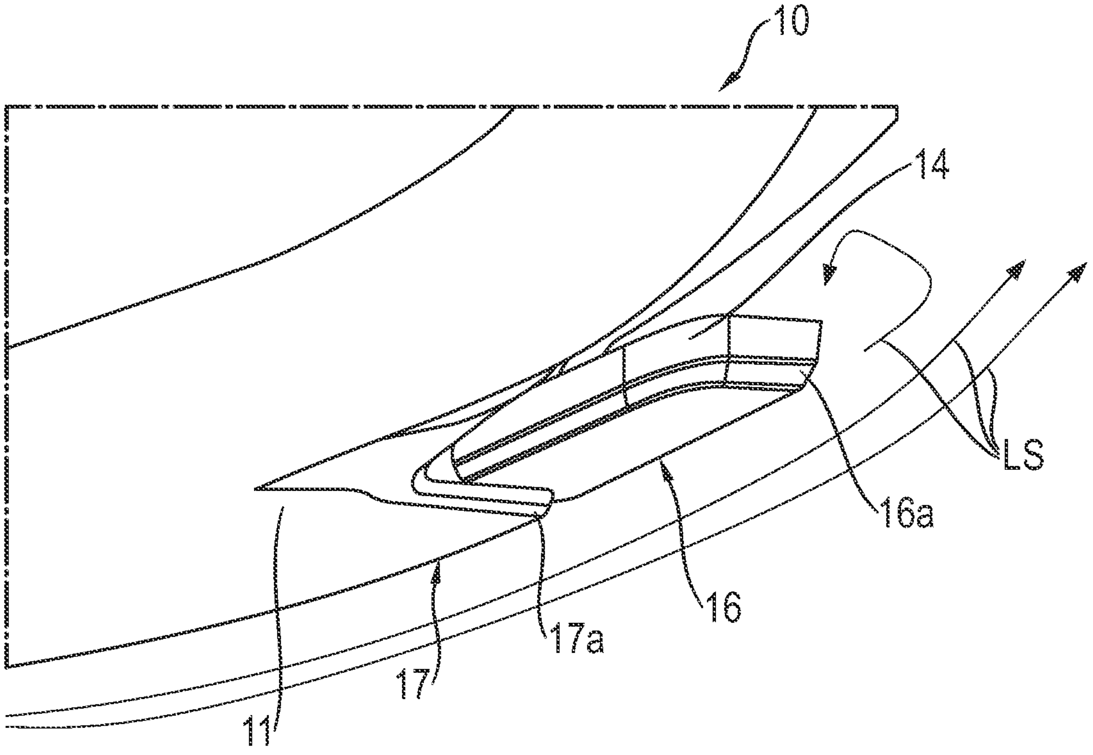

FIGS. 10*a* and 10*b* also show the air guidance element 14 of the air directing device 13 in two different states, i.e., in FIG. 10*a* in the retracted rest position and in FIG. 10*b* in the extended operational position, whereby FIG. 10*b* again shows the flush transition between the flow guide surface 16 of the air guidance element 14 and the front of or before the same immediately connected outer surface 17 of the rear vehicle body member 11.

Also shown in FIGS. 10*a* and 10*b* is an airflow LS in the region of the rear vehicle body member 11, i.e., in FIG. 10*a* an airflow LS along the air guidance element 14 when displaced to the retracted rest position and, in FIG. 10*b*, along air guidance element 14 when displaced to the extended operational position.

Whereas in FIG. 10*a* the air flow LS detaches in the region of an edge 17*a* of the outer surface 17 of the rear vehicle body member 11, in FIG. 10*b* this detachment of the air flow LS takes place in the region of an edge 16*a* of the flow guide surface 16 of the air guidance element 14. In FIG. 10*a*, this edge 16*a* of the flow guide surface 16 is covered from outside by the edge 17*a* of the outer surface 17 of the rear vehicle body member 11.

In the retracted rest position, the flow guide surface 16 of the air guidance element 14 is fully retracted into the lateral rear region 10 and entirely covered from outside by the outer surface 17 of the rear vehicle body member 11.

Figure 4A:
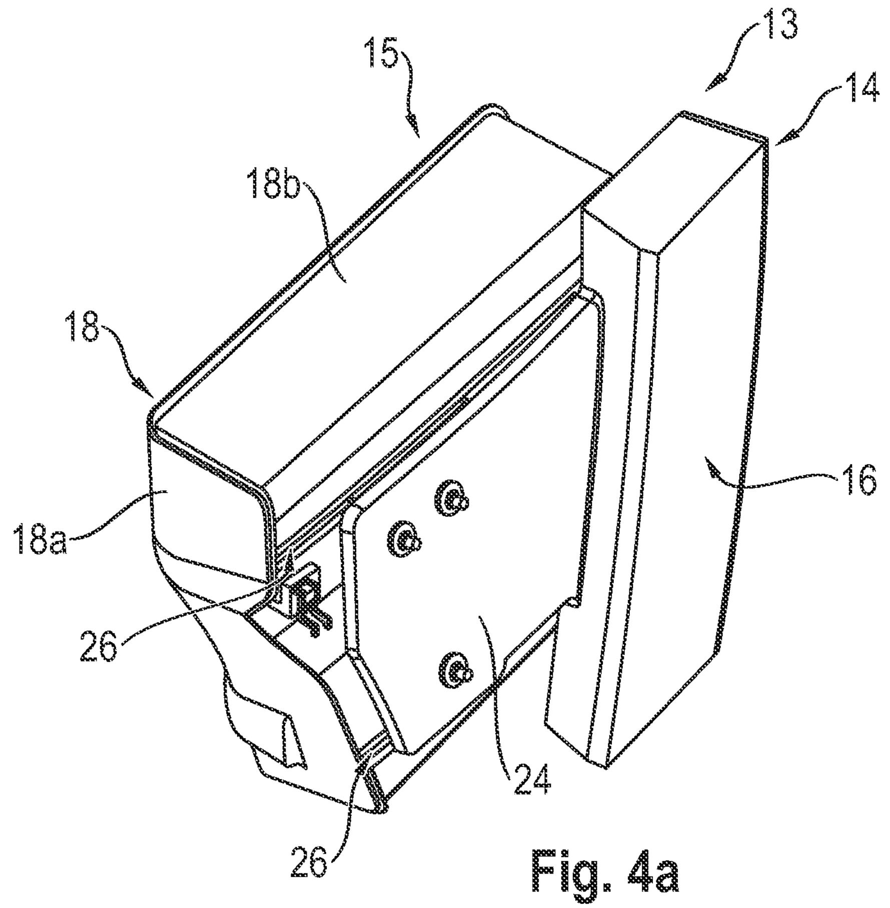
FIGS. 4*a*, 4*b* show two views of the air directing device in the retracted rest position.
Figure 4B:
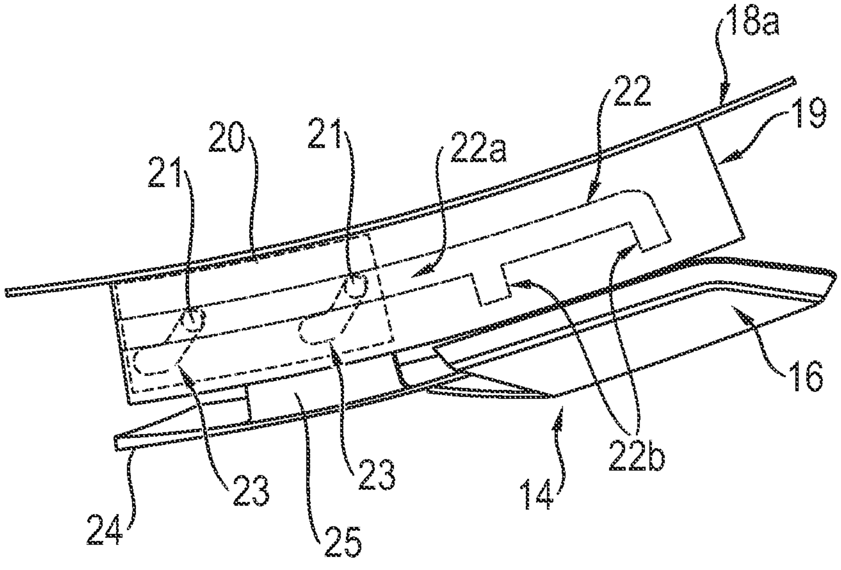
Figure 5A:
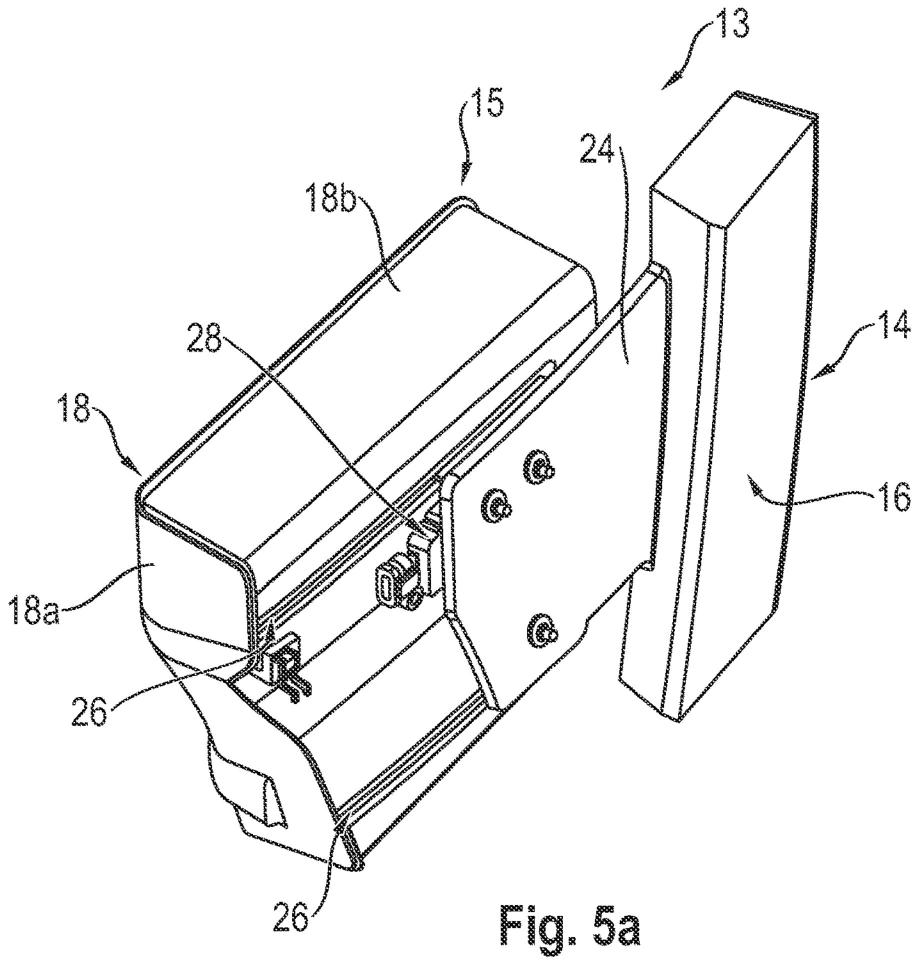
FIGS. 5*a*, 5*b* show two views of the air directing device in the intermediate position.
Figure 5B:
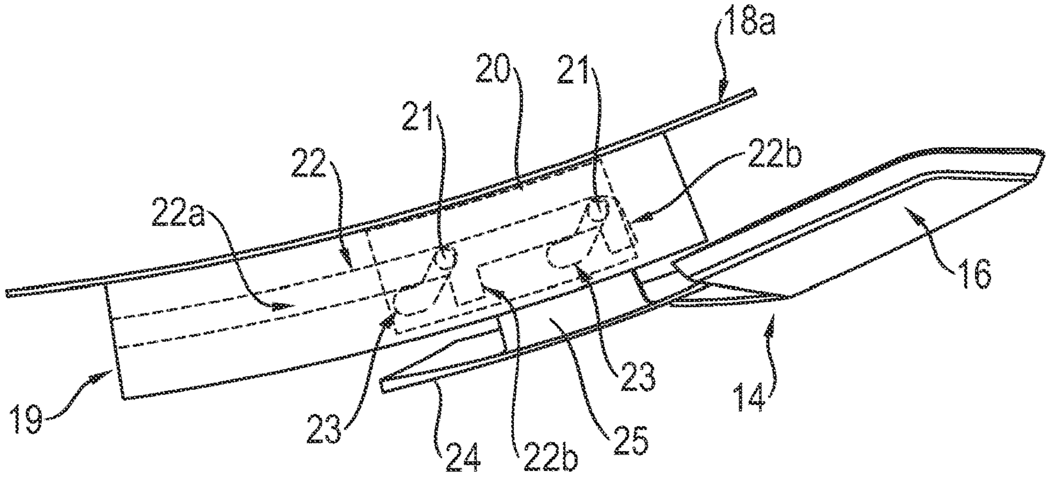
Figure 6A:
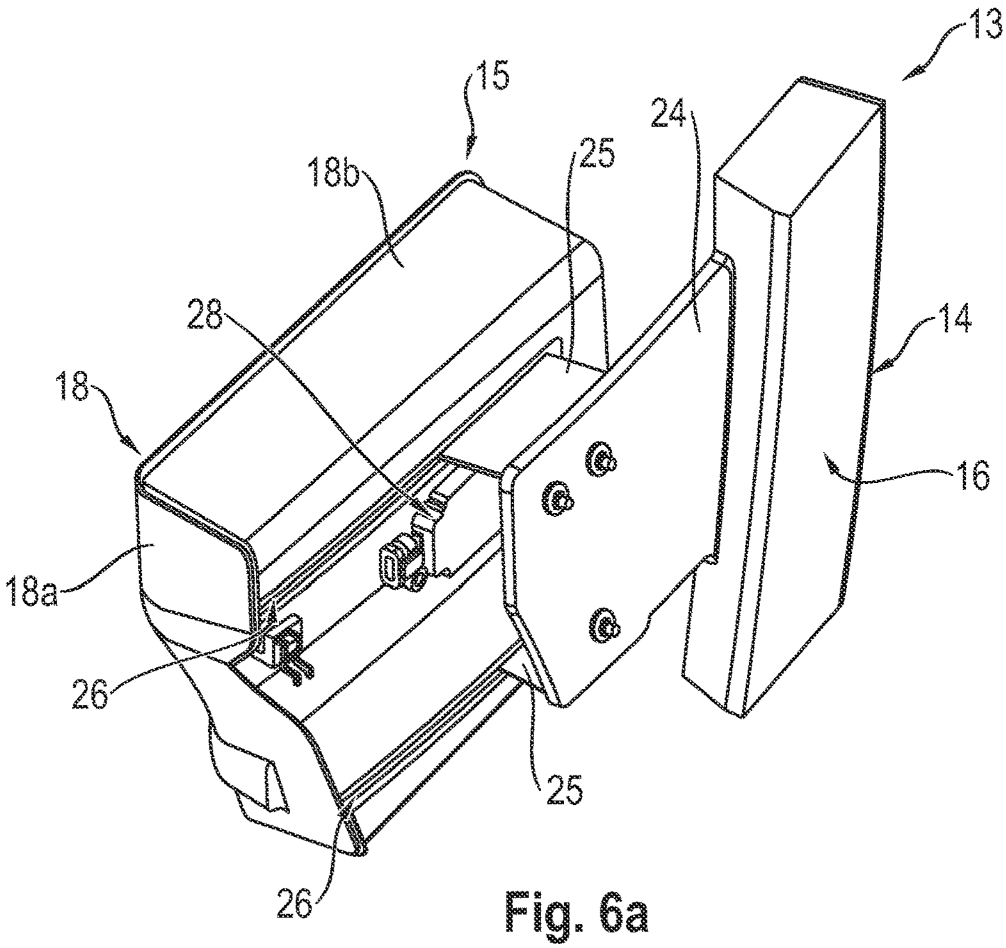
FIGS. 6*a*, 6*b* show two views of the air directing device in the extended operational position.
Figure 6B:
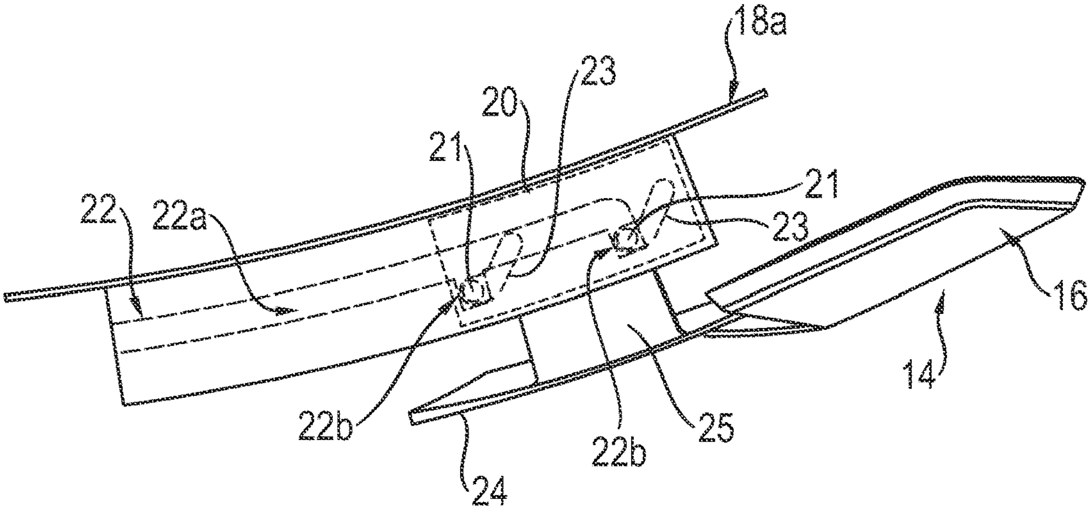

FIGS. 4*a* to 6*b* show further details of the air directing device 13 of the lateral rear region 10 according to aspects of the invention, whereby in FIGS. 4*a* to 6*b* the air directing device 13 is shown alone, i.e., in FIGS. 4*a*, 4*b* in the retracted rest position, in FIGS. 6*a*, 6*b* in the extended operational position, and in FIGS. 5*a*, 5*b* in an intermediate position between retracted rest position and the extended operational position.

The guide and drive unit 15 of the air directing device 13, which is used to displace the air guidance element 14 between the retracted rest position and the extended operational position, comprises a housing 18 consisting of a first housing member 18*a* and a second housing member 18*b*. Both housing members 18*a*, 18*b* are respectively shown in FIGS. 4*a*, 5*a*, 6*a*. In FIGS. 4*b*, 5*b*, and 6*b*, the respective second housing member 18*b* is not shown.

At least one fixed guide rail 19 of the guide and drive unit 15 is accommodated in the housing 18. In particular, two such guide rails 19 are arranged in the housing 18, i.e., an upper fixed guide rail 19 and a lower fixed guide rail 19. In FIGS. 4*b*, 5*b*, and 6*b*, the respective upper fixed guide rail 19 is visible.

The respective fixed guide rail 19 works together with a sliding block 20, which is displaceable relative to the respective fixed guide rail 19. The air guidance element 14 is guided by at least one guide bolt 21 on a respective guide rail 19 and on a respective sliding block 20. Preferably, two upper guide bolts 21 of the air guidance element 14 work together with the upper fixed guide rail 19 and the upper sliding block 20 (see FIGS. 7*a*, 7*b*, 8*a*, 8*b*, 9*a*, 9*b*, 12). Preferably a single lower guide bolt 21 of the air guidance element 14 works together (see FIGS. 7*a*, 8*a*, 9*a*, 12) with the lower fixed guide rail 19 and the lower sliding block 20 (not visible in FIGS. 4*b*, 5*b*, 6*b*).

The guide bolts 21 engage with a respective guide groove 22 of the respective guide rail 19 and with a respective guide groove 23 of the respective sliding block 20. Via a drive 28 of the guide and drive unit 15, the respective sliding block 20 is displaceable relative to the respective guide rail 19 and via the respective sliding block 20, the air guidance element 14 is displaceable relative to the rear vehicle body member 11.

If the air guidance element 14 is to be displaced from the retracted rest position of FIGS. 4*a*, 4*b* to the extended operational position of FIGS. 6*a*, 6*b*, the respective sliding block 20 is first displaced translationally along the respective guide rail 19, whereby the guide bolts 21 are or are to be displaced in a first guide portion 22*a* of the respective guide groove 22 of the respective guide rail 19.

If the or one of the guide bolts 21 comes into contact with a limitation of this first guide portion 22*a* of the guide groove 22 of the respective guide rail 19, the guide bolt or guide bolts 21 can no longer be displaced within the first guide portion 22*a*. In this case, the air guidance element 14 then occupies the intermediate position of FIGS. 5*a*, 5*b*.

If the respective sliding block 20 is subsequently further translationally displaced relative to the respective guide rail 19, the guide bolt(s) 21, which is/are also guided in the at least one guide groove 23 of the sliding block 20, about the respective sliding block 20, i.e., the at least one guide groove 23 thereof, will be pushed into a respective second guide portion 22*b* of the guide groove 22 of the respective guide rail 19, i.e., in the transverse direction of the motor vehicle outwards. This is achieved by the curved contour of the at least one guide groove 23 of the respective sliding block 20, which is curvedly contoured and extends obliquely to the guide portions 22*a*, 22*b* of the guide groove 22 of the respective guide rail 19.

When the air guidance element 14 is displaced from the retracted rest position shown in FIG. 4*b* to the extended operational position shown in FIG. 6*b*, the guide bolts 21 of the air guidance element 14 are accordingly first displaced along the first guide portions 22*a* of the guide grooves 22 of the guide rails 19 in the longitudinal direction or primarily in the longitudinal direction of the motor vehicle until this is not possible. In that case, the air guidance element 14 then occupies the intermediate position of FIG. 5*b* and is displaced rearward in the longitudinal direction of the vehicle. The first guide portions 22*a* of the guide grooves 22 of the guide rails 19 extend in the longitudinal direction or primarily in the longitudinal direction of the motor vehicle. These same can include an acute angle of up to 15° or up to 10° or up to 5° with the longitudinal direction of the motor vehicle. Given further relative movement of the respective sliding block 20 rearward relative to the respective guide rails 19, the guide bolts 21 are then moved outward along the guide grooves 23 of the sliding blocks 20, as well as along the second guide portions 22*b* of the guide grooves 22 of the guide rails 19 extending in the transverse direction of the motor vehicle or primarily in the is transverse direction of the motor vehicle. The air guidance element 14 is then transitioned to the operational position in FIG. 6*b*. The second guide portions 22*b* are perpendicular to the first guide portions 22*a*.

The air directing device 13 or the air guidance element 14 comprises a tab 24, on which protrusions 25 engage. The tab 24 extends forward from the air guidance element 14 in the longitudinal vehicle direction, is displaceable together with the air guidance element 14, and is always covered by the rear vehicle body member 11. The tab 24 is a 'part' of the air guidance element 14, but does not provide the flow guide surface 16 of the air guidance element 14. The protrusions 25 extend from the tab 24 in the transverse direction of the vehicle. The guide bolts 21 are formed or arranged on the protrusions 25. The protrusions 25 and guide bolts 21 are also 'part' of the air guidance element 14.

Starting from a side of the tab 24 facing away from the flow guide surface 16 the protrusions extend via portions through slots 26 in the housing member 18*b* and into the housing 18. The guide bolts 21 are formed or arranged on the portions of these protrusions 25 positioned in the housing 18.

Overlapping double guidance is provided via the interaction of the respective guide rail 19 with the respective sliding block 20. Displacement initially takes place in the longitudinal direction, or primarily in the longitudinal direction, followed by displacement in the transverse direction, or primarily in the transverse direction.

Figure 7A:
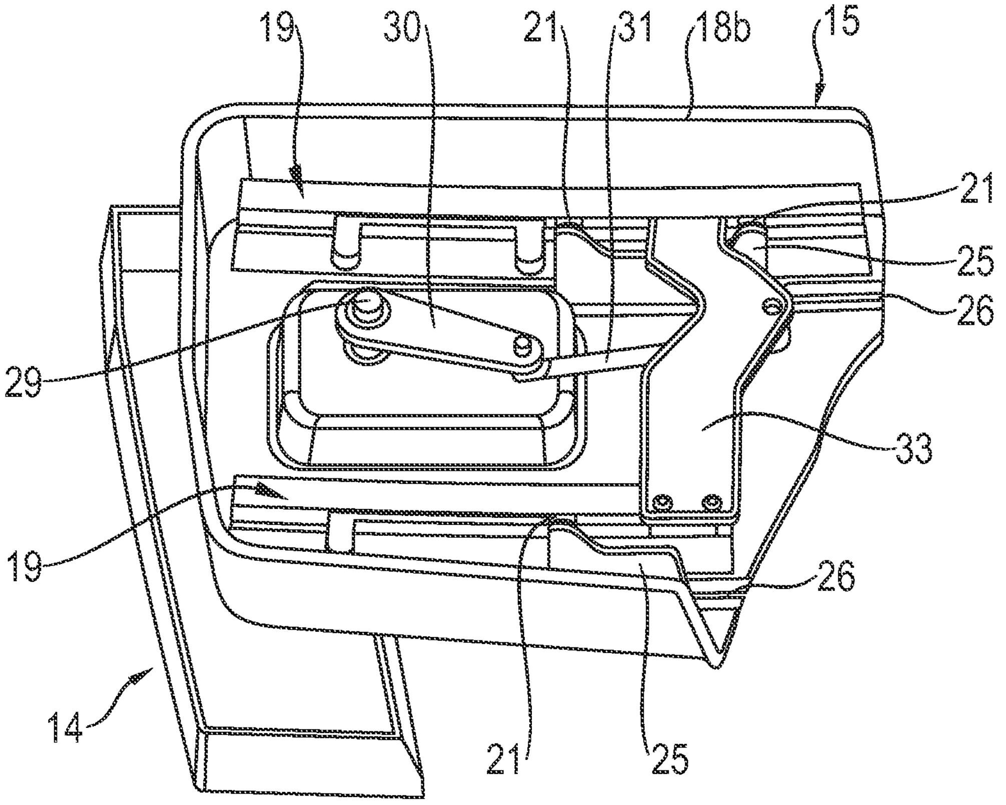
FIGS. 7*a*, 7*b* show drive-side details of the lateral rear region according to aspects of the invention in the first state thereof.
Figure 7B:
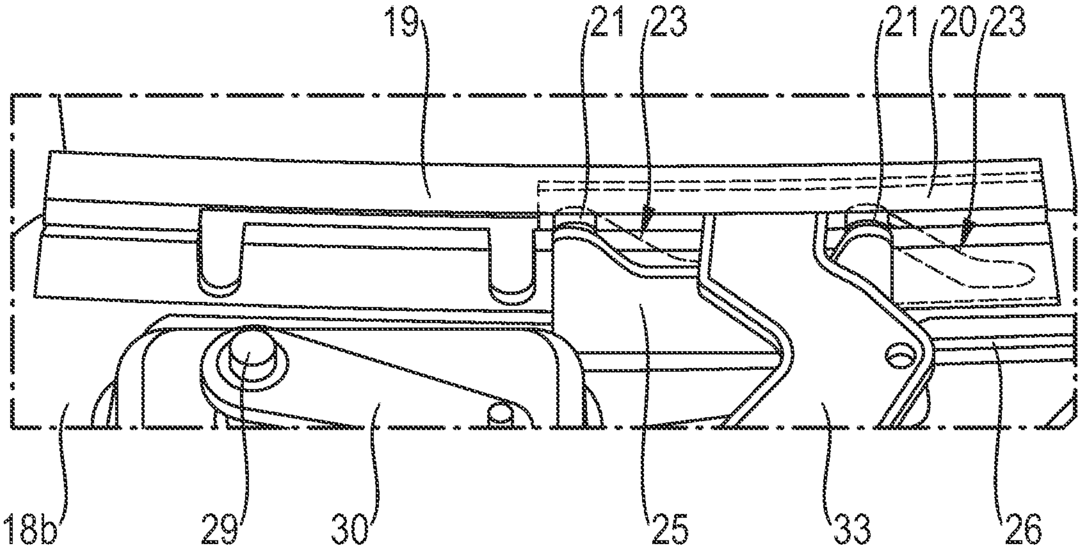
Figure 8A:
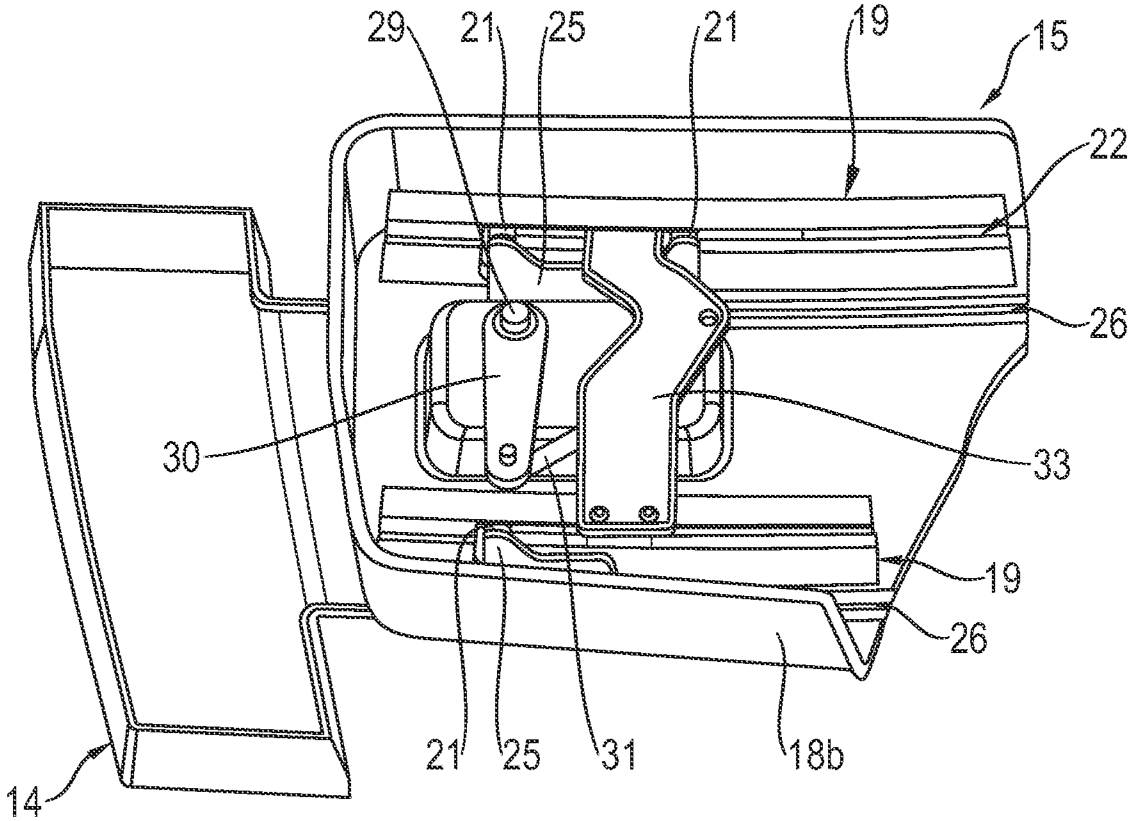
FIGS. 8*a*, 8*b* show the drive-side details of FIGS. 7*a*, 7*b* in the second state of the rear region.
Figure 8B:
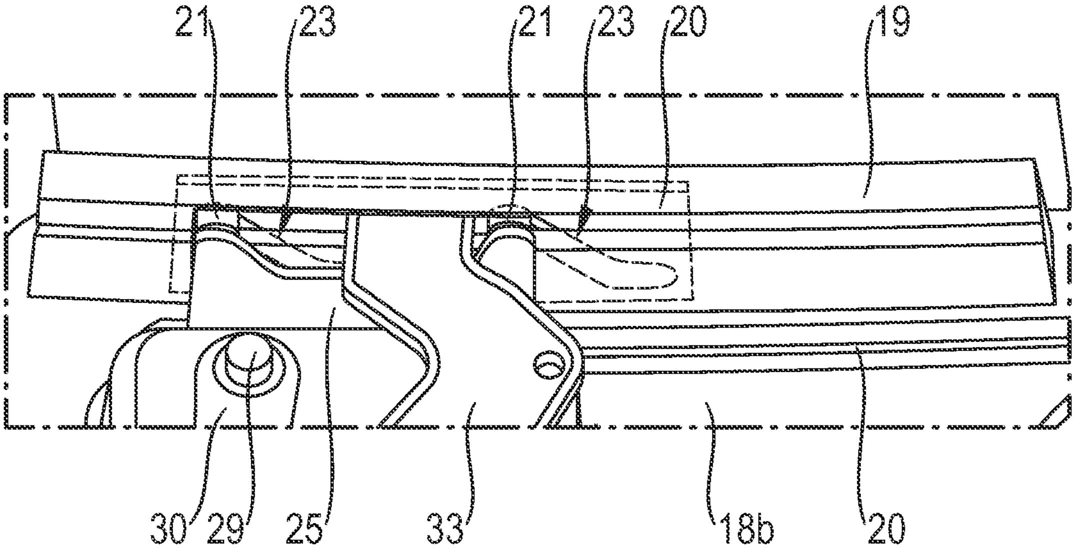
Figure 9A:
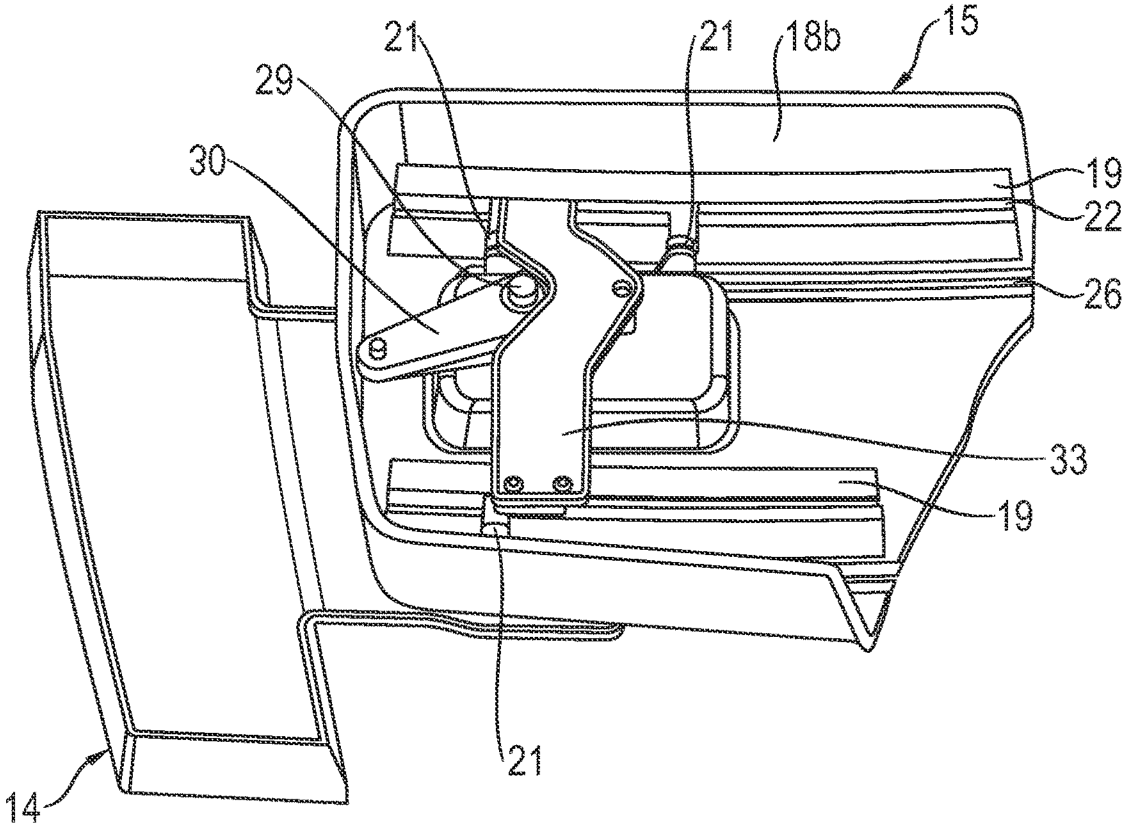
FIGS. 9*a*, 9*b* show the drive-side details of both FIGS. 7*a*, 7*b* and FIGS. 8*a*, 8*b* in the third state of the rear region.
Figure 9B:
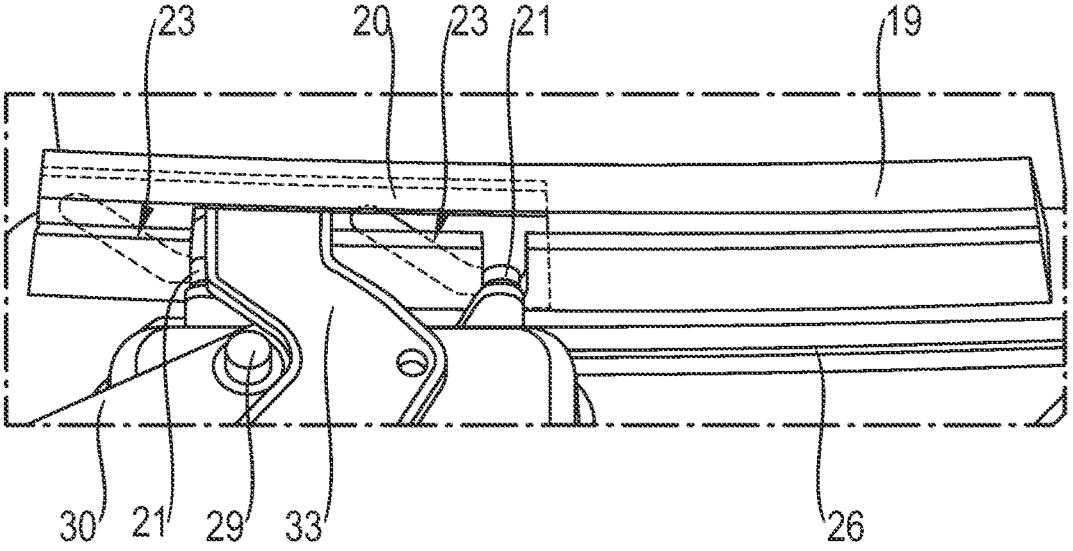

FIGS. 7*a* to 9*b* show further details of the air guide device 13 in different states thereof, i.e., in FIGS. 7*a*, 7*b* in the retracted rest position, in FIGS. 9*a*, 9*b* in the extended operational position, and in FIGS. 8*a*, 8*b* in an intermediate position between the retracted rest position and the extended operational position. The state shown in FIGS. 7*a*, 7*b* corresponds to the state in FIGS. 4*a*, 4*b*. The state in FIGS. 8*a*, 8*b* corresponds to the state in FIGS. 5*a*, 5*b*, and the state in FIGS. 9*a*, 9*b* corresponds to the state in FIGS. 6*a*, 6*b*.

According to FIGS. 7*a* to 9*b*, the drive 28 of the guide and drive unit 15 is designed as a crank drive comprising a crank 29, a crank arm 30, and a coupling arm 31. The crank 29 is driveable by a drive motor 32 of the drive 28, whereby the crank arm 30 and the coupling arm 31 implement a rotational movement of the crank 29 during the displacement of the air guidance element 14 of the air directing device 13 relative to the rear vehicle body member 11 in order to displace the air guidance element 14 between the retracted rest position and the extended operational position.

The crank 29 is directly coupled to and rotationally driven by the drive motor 32. The drive motor 32 is designed as an electric motor.

A first end of the crank arm 30 engages the crank 29 in a rotatably fixed manner. An opposite, second end of the crank arm 30 pivotably engages with a first end of the coupling arm 31, and an opposite, second end of the coupling arm 31 pivotably engages with a guide carriage 33, which is attached to both sliding blocks 20.

The crank arm 30 and the coupling arm 31 accordingly translate rotational movement of the crank 29 into a translational movement of both the guide carriage 33 and the sliding blocks along the guide rails 19 in order to displace the air guidance element 14 of the air directing device 13 between the retracted rest position and the extended operational position.

Figure 11:
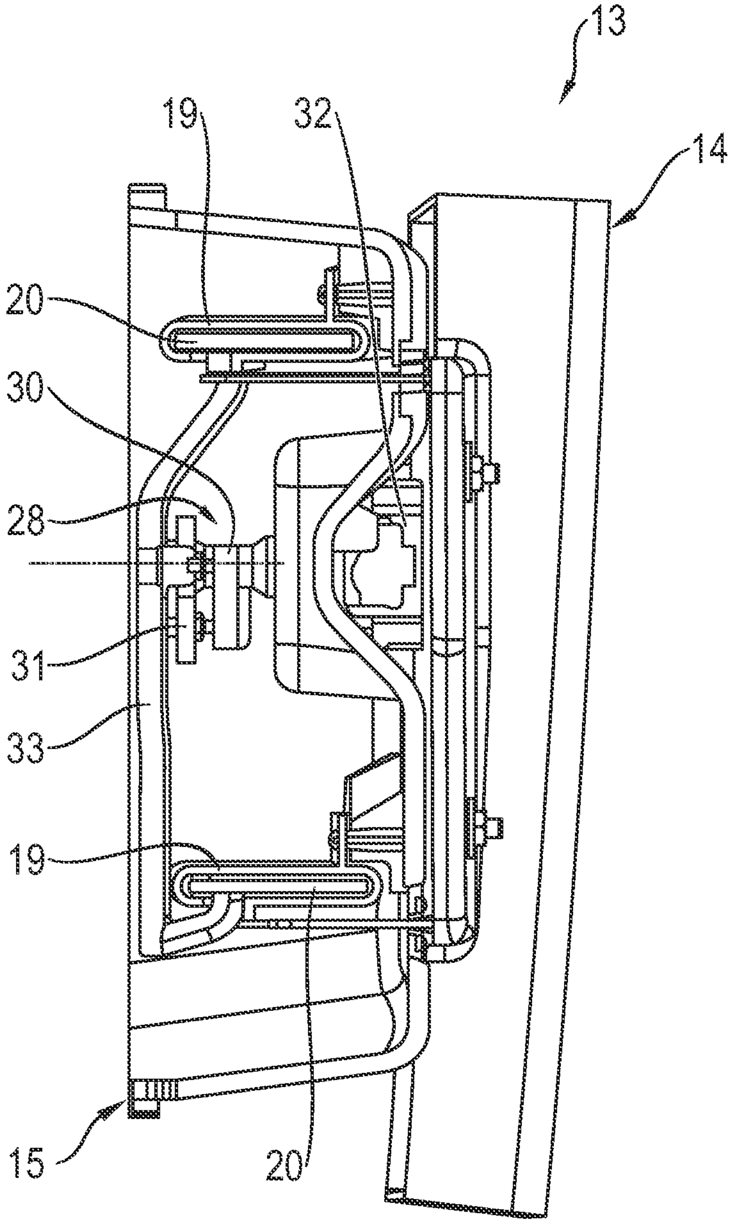
FIG. 11 shows a cross section through the lateral rear region according to aspects of the invention.

FIG. 11 shows a cross section through the air directing device 13, in particular in the region of the guide and drive unit 15 thereof. FIG. 11 in particular shows the two fixed guide rails 19 positioned above each other, the same associated sliding blocks 20, and the guide carriage 33, which is connected to the sliding block 20. Also shown in FIG. 11 is the crank drive, i.e., the drive motor 32, the crank arm 30, and the coupling arm 31.

Figure 12:
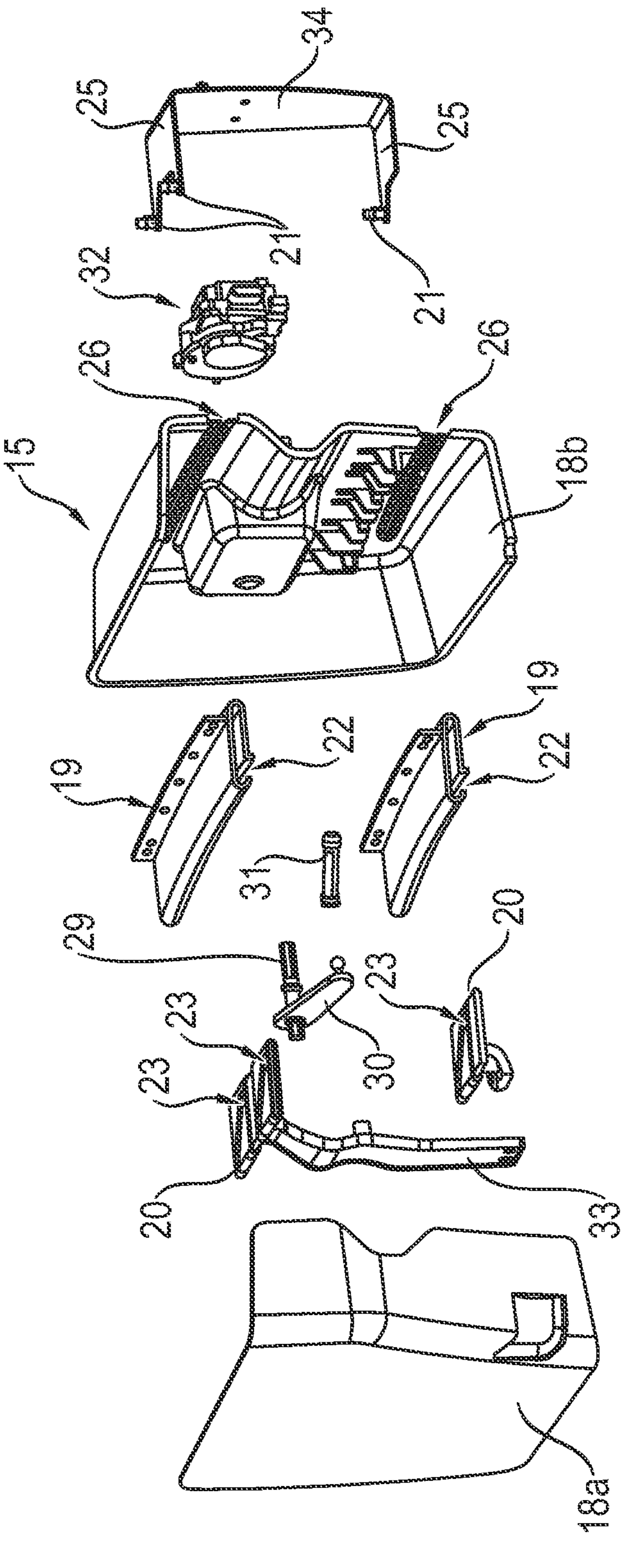
FIG. 12 shows an exploded view of the lateral rear region according to aspects of the invention.

FIG. 12 shows an exploded view, in particular of assemblies of the guide and drive unit 15. It can be gathered from FIG. 12 that the protrusions 25, on which the guide bolts 21 are arranged or formed, are connected via a bar 34. The protrusions 25 can be mounted on the tab 24 via this bar 34.

What is claimed is:

1. A lateral rear region of a motor vehicle comprising:

a rear vehicle body member extending at least behind a rear wheel housing of the motor vehicle, and an air directing device having an air guidance element that is displaceable relative to the rear vehicle body member between a rest position retracted in the lateral rear region and an operational position extended out of the lateral rear region such that, in the rest position, a flow guide surface of the air guidance element is covered by the rear vehicle body member and, in the operational position, the flow guide surface of the air guidance element is, at least in a longitudinal direction of the motor vehicle, displaced rearward relative to the rear vehicle body member, wherein the air directing device further comprises a guide and drive unit which guides and drives the air guidance element during the displacement of the air guidance element relative to the rear vehicle body member, wherein a drive of the guide and drive unit is configured as a crank drive comprising a crank, a crank arm, and a coupling arm, wherein the crank arm and the coupling arm implement a rotational movement of the crank during the displacement of the air guidance element of the air directing device relative to the rear vehicle body member, wherein a first end of the crank arm of the crank drive engages with the crank of the crank drive, and a second end of the crank arm engages with a first end of the coupling arm of the crank drive, and wherein a second end of the coupling arm engages with a guide carriage of the guide and drive unit, which guide carriage is operatively connected to the air guidance element of the air directing device.

2. The lateral rear region according to claim 1, wherein the guide and drive unit comprises at least one fixed guide rail and at least one sliding block, which is configured to be displaced relative to the fixed guide rail, wherein the crank drive displaces the sliding block relative to the fixed guide rail, and displaces the air guidance element of the air directing device relative to the rear vehicle body member via the respective sliding block.

3. The lateral rear region according to claim 2, wherein the guide carriage engages with the sliding block and displaces the sliding block relative to the fixed guide rail.

4. The lateral rear region according to claim 2, wherein the second end of the crank arm and the first end of the coupling arm pivotably engage with one another, and the second end of the coupling arm pivotably engages with the guide carriage.

5. The lateral rear region according to claim 2, wherein the guide and drive unit comprises an upper fixed guide rail, a lower fixed guide rail, an upper sliding block and a lower sliding block, wherein two upper guide bolts are inserted into the guide grooves of the upper guide rail and of the upper sliding block, and wherein a single lower guide bolt is inserted into the guide grooves of the lower guide rail and of the lower sliding block, and wherein the guide carriage is arranged between the upper and lower fixed guide rails and connected to the upper and lower sliding blocks.

6. The lateral rear region according to claim 1, wherein the flow guide surface of the air guidance element in the operational position is displaced rearward relative to the rest position when viewed in a longitudinal direction of the motor vehicle, and, the air guidance element in the operational position is displaced outward when viewed in a transverse direction of the motor vehicle, such that, in the operational position, the flow guide surface of the air guidance element extends flush with a front of an outer surface of the rear vehicle body member, which is immediately connected to the flow guide surface.

7. A motor vehicle comprising two lateral rear regions according to claim 1.

8. A lateral rear region of a motor vehicle comprising:

a rear vehicle body member extending at least behind a rear wheel housing of the motor vehicle, and an air directing device having an air guidance element that is displaceable relative to the rear vehicle body member between a rest position retracted in the lateral rear region and an operational position extended out of the lateral rear region such that, in the rest position, a flow guide surface of the air guidance element is covered by the rear vehicle body member and, in the operational position, the flow guide surface of the air guidance element is, at least in a longitudinal direction of the motor vehicle, displaced rearward relative to the rear vehicle body member, wherein the air directing device further comprises a guide and drive unit which guides and drives the air guidance element during the displacement of the air guidance element relative to the rear vehicle body member, wherein a drive of the guide and drive unit is configured as a crank drive comprising a crank, a crank arm, and a coupling arm, wherein the crank arm and the coupling arm implement a rotational movement of the crank during the displacement of the air guidance element of the air directing device relative to the rear vehicle body member, wherein the guide and drive unit comprises at least one fixed guide rail and at least one sliding block, which is configured to be displaced relative to the fixed guide rail, wherein the crank drive displaces the sliding block relative to the fixed guide rail, and displaces the air guidance element of the air directing device relative to the rear vehicle body member via the respective sliding block, wherein the air guidance element engages with guide bolts in a guide groove of the fixed guide rail, and at least one guide groove of the sliding block.

9. The lateral rear region according to claim 8, wherein the guide groove of the fixed guide rail comprises a first guide portion for the displacement of the guide bolts, and thus the air guidance element, in the longitudinal direction or primarily in the longitudinal direction of the motor vehicle, and comprises at least a second guide portion for the displacement of the guide bolts, and thus the air guidance element, in the transverse direction or primarily in the transverse direction of the motor vehicle.

10. The lateral rear region according to claim 9, wherein the at least one guide groove of the sliding block is curvedly contoured and extends obliquely to the guide portions of the fixed guide rail.

11. A lateral rear region of a motor vehicle comprising:

a rear vehicle body member extending at least behind a rear wheel housing of the motor vehicle, and an air directing device having an air guidance element that is displaceable relative to the rear vehicle body member between a rest position retracted in the lateral rear region and an operational position extended out of the lateral rear region such that, in the rest position, a flow guide surface of the air guidance element is covered by the rear vehicle body member and, in the operational position, the flow guide surface of the air guidance element is, at least in a longitudinal direction of the motor vehicle, displaced rearward relative to the rear vehicle body member, wherein the air directing device further comprises a guide and drive unit which guides and drives the air guidance element during the displacement of the air guidance element relative to the rear vehicle body member, wherein a drive of the guide and drive unit is configured as a crank drive comprising a crank, a crank arm, and a coupling arm, wherein the crank arm and the coupling arm implement a rotational movement of the crank during the displacement of the air guidance element of the air directing device relative to the rear vehicle body member, wherein the guide and drive unit comprises at least one fixed guide rail and at least one sliding block, which is configured to be displaced relative to the fixed guide rail, wherein the crank drive displaces the sliding block relative to the fixed guide rail, and displaces the air guidance element of the air directing device relative to the rear vehicle body member via the respective sliding block, wherein the guide and drive unit comprises a housing, wherein the at least one fixed guide rail and the at least one sliding block are arranged in an interior space of the housing, wherein protrusions of the air guidance element extend from a side of the air guidance element facing away from the flow guide surface via portions through slots in the housing and into the housing.

* * * * *